UNITED STATES PATENT OFFICE.

WILLIAM T. SOLOMON, OF PITTSBURG, PENNSYLVANIA, ASSIGNOR TO ROBERT C. HALL, OF PITTSBURG, PENNSYLVANIA.

COMPOUND TO BE USED IN THE MANUFACTURE OF GAS.

No. 885,096.  Specification of Letters Patent.  Patented April 21, 1908.

Application filed January 30, 1907. Serial No. 354,915.

*To all whom it may concern:*

Be it known that I, WILLIAM T. SOLOMON, of Pittsburg, in the county of Allegheny and State of Pennsylvania, have invented a certain new and useful Compound to be Used in the Manufacture of Gas, of which the following is a clear, full, and exact description.

My invention relates to the manufacture of gas from the alcohols, of permanent constitution and of high calorific intensity and illuminating power, suitable for heating, for lighting, or for the generation of power.

Alcohol has long been known as a fluid containing a large amount of energy in concentrated form, but the utilization of this energy in combustion has heretofore presented a great many difficulties owing to the fact that the vapor derived from alcohol when heated, or evaporated under ordinary conditions, is easily condensed again when cooled or when subjected to slight pressure. This causes the conducting passages of any combustion apparatus which may be employed to become rapidly clogged and likewise prevents the transmission of the alcoholic vapors to any considerable distance from the generating station. Pure alcohol also under ordinary conditions burns when ignited with an almost colorless flame, which renders it or its vapors unpractical for use as an illuminant.

My invention avoids all these difficulties and enables me to produce a fluid compound which when brought in contact with alcohol, or alcoholic vapor, generates a mixture of permanent gases, rich in hydrocarbons, which burn with the production of a brilliant, intense light, and which are equally adapted to the production of a high heat or the generation of power in gas engines.

I will now describe my invention so that others skilled in the art to which it appertains may employ the same.

In a suitable vessel I will mix one quart of alcohol with about two ounces of concentrated sulfuric acid, the acid and alcohol being slowly mixed with each other and thoroughly agitated during the mixing operation. This is attended by a considerable elevation of temperature and the formation of sulfethylic acid, $H_2CH_5SO_4$, and some ether $(C_2H_5)_2O$. These are held in solution by the excess of alcohol. In a separate vessel I mix eight ounces of benzene with two ounces of nitric acid, likewise mixing them slowly and agitating thoroughly during the mixing. This operation is attended by the formation of nitrobenzol, $C_6H_5NO_2$, and dinitro-benzene. These compounds are insoluble in water but are readily soluble in the excess of alcohol to which they may be added in the manufacture of gas.

After the sulfuric acid and alcohol and the nitric acid and benzene have been mixed in separate vessels as above described and the reaction completed, I pour the contents of these two separate vessels together into a suitable receptacle, which is preferably of glass, again agitating during the mixing. This third mixture results in a reaction between the compounds formed during the first two mixtures, whereby a portion of the nitrobenzol and free benzene unites with a portion of the sulfethylic acid to form benzene sulfonic acid, $C_6H_5SO_3H$, and phenol, $C_6H_6O$. There is also some free sulfuric and free nitric acid present, which together act as powerful oxidizing agents and convert other portions of the excess alcohol and benzene into other portions of nitrous ether, $C_2H_5NO$, aldehyde, $C_2H_4O$, etc. If, when so mixed, there should be a thick or opaque stratum at the top of the mixture, it indicates that there is too much free acid present, and an excess of undissolved nitrobenzol, phenol, etc., and I add more alcohol to the mixture until the opaque stratum disappears and a clear homogeneous solution results. If, on the other hand, oily globules are floating on the top of the mixture, it indicates that the acid is too weak and the oxidizing action uncompleted and I add more nitric acid until the oily globules disappear. The compound so formed may be bottled and employed as hereinafter described in the manufacture of gases from alcohol.

By the term alcohol, as used in this specification, it is intended to refer to any of the lower alcohols of the general formula $C_nH_{2n+2}O$. The members of this series most commonly known are methyl or wood alcohol and ethyl or grain alcohol. I may use one or both of these mixed or the denatured alcohol of commerce.

The reaction between the two mixtures as set forth in the specification is expressed by the equation,

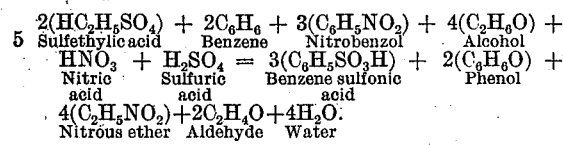

In the manufacture of gas from these compounds, alcohol or alcoholic vapor is brought in contact with the compound and by causing air to pass through or over the alcohol and compound, the resultant gas may be collected and used or stored for use. I may proceed in many ways which differ from each other in minor details. In one of the methods of the manufacture of gas, as it has been practiced by me, I take ten gallons of alcohol and mix with it about one quart of the compound made from alcohol, sulfuric acid, benzene and nitric acid, as hereinbefore described. I place this mixture in a suitable apparatus, such as an ordinary carbureter and force air through the mixture in the carbureter. The gas which is formed in this operation is collected, and, after being passed through quick-lime or other suitable drying agent, to remove the moisture, it is conducted to a suitable gas reservoir.

Another method of using this compound in the manufacture of gas, which is specifically claimed in a separate application, Serial No. 354,914, may be employed. In it I place the alcohol alone in the carbureter, and the compound formed of alcohol, benzene, and acids, which, for brevity, I will call the conversion compound, in a second closed receptacle. Air is forced through the alcohol in the carbureter as before and the mixture of air and alcoholic vapors which result, are then forced into or through the conversion compound in the second vessel. In this passage the alcoholic vapor is converted into a permanent gas of the same general nature as that formed where the alcohol and conversion compound are mixed in the carbureting vessel. This gas is then dried and conducted to a storage reservoir as before described.

The gas produced by the use of the conversion compound retains many of the desirable characteristics of alcoholic vapor and possesses many valuable properties in addition thereto. One of the most important of these new qualities is that the gas does not condense even at high pressure and ordinary low temperatures. It can, therefore, be stored for any length of time and conducted to any desired distance without any danger of deterioration or of the clogging of the reservoirs, pipes, or burners. Again, when burned in a suitable burner, it produces an intensely white and brilliant light, far superior to the ordinary gas or electric incandescent light. It has a high calorific value and may be used with great advantage for fuel. Owing to its great expansive force it is better adapted for use as a motive power than is the gas or vapor produced from gasolene.

In the use of my invention, I may, as hereinbefore stated, employ any of the alcohols of commerce, or a mixture of two or more of them. I do not desire to limit my invention to the use of benzene. The benzene in certain cases may be omitted, the nitric acid alone being mixed with the sulfethylic acid.

Many other changes may suggest themselves to the skilled mechanic in adapting my invention to the various uses to which gas may be applied.

Although the only use known to me to which my compound may be put is the manufacture of gas, the manufacture of which is a part of the invention described in this specification, I do not desire to limit myself to any one manner of use in such manufacture.

What I claim is:

1. As a new article of manufacture to be used in the manufacture of gas, a composition composed of sulfethylic acid, nitrobenzol, and allied ether and nitro compounds, substantially as specified.

2. As a new article of manufacture, a composition composed of sulfethylic acid, nitrobenzol, and allied ether and nitro compounds, dissolved in alcohol and adapted to be employed in the manufacture of a gas therefrom.

3. In the manufacture of gas from alcohol, subjecting the alcohol to the action of a composition formed from alcohol, sulfuric acid, nitric acid and benzene.

4. In the manufacture of gas from alcohol, subjecting the alcohol to the action of a composition formed from alcohol, sulfuric acid, and nitric acid.

In testimony whereof, I have hereunto set my hand.

WILLIAM T. SOLOMON.

Witnesses:
JAMES K. BAKEWELL,
CARRIE E. EGGERS.